United States Patent
Chen et al.

(10) Patent No.: US 9,835,522 B2
(45) Date of Patent: Dec. 5, 2017

(54) INDUCTION DIAGNOSTICS FOR SKIP FIRE ENGINE

(71) Applicant: Tula Technology Inc., San Jose, CA (US)

(72) Inventors: Shikui Kevin Chen, San Jose, CA (US); Allan J. Kotwicki, Williamsburg, MI (US); Joel D. Van Ess, Campbell, CA (US); Robert S. Bailey, San Jose, CA (US); Mohammad R. Pirjaberi, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 170 days.

(21) Appl. No.: 14/919,385

(22) Filed: Oct. 21, 2015

(65) Prior Publication Data
US 2016/0116371 A1 Apr. 28, 2016

Related U.S. Application Data

(60) Provisional application No. 62/067,873, filed on Oct. 23, 2014.

(51) Int. Cl.
*G01M 15/05* (2006.01)
*F02M 35/10* (2006.01)
*G01M 15/09* (2006.01)

(52) U.S. Cl.
CPC ........ *G01M 15/05* (2013.01); *F02M 35/1038* (2013.01); *G01M 15/09* (2013.01)

(58) Field of Classification Search
CPC ... F02M 35/1038; G01M 15/05; G01M 15/09
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |
| 4,509,488 A | 4/1985 | Forster et al. | |
| 5,377,631 A | 1/1995 | Schechter | |

(Continued)

OTHER PUBLICATIONS

International Search Report dated Feb. 23, 2016 from international application No. PCT/US15/56732.

(Continued)

*Primary Examiner* — Francis Gray
(74) *Attorney, Agent, or Firm* — Beyer Law Group LLP (57) ABSTRACT

A variety of methods and arrangements for detecting failure of the commanded air induction in an internal combustion engine are described. In some embodiments, the intake manifold pressure is monitored. An air induction event generates a fluctuation in the intake manifold pressure, which is recorded. The signal is processed through a diagnostic filter to help determine whether the actual induction matched the commanded induction. In other embodiments, measured crankshaft acceleration is compared with estimated crankshaft acceleration. If the two quantities differ by a threshold amount an induction fault is detected. The two detection methods may also be combined. The describe approaches are particularly well suited for use in engines operating in a skip fire mode with cylinder deactivation and/or a dynamic firing level modulation mode.

24 Claims, 8 Drawing Sheets

(56) References Cited

U.S. PATENT DOCUMENTS

| | | | |
|---|---|---|---|
| 5,490,486 A | 2/1996 | Diggs | |
| 6,158,411 A | 12/2000 | Morikawa | |
| 6,408,625 B1 * | 6/2002 | Woon | F02D 17/02 |
| | | | 123/198 F |
| 6,619,258 B2 | 9/2003 | McKay et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,314,034 B1 * | 1/2008 | Waters | F02D 13/06 |
| | | | 123/198 F |
| 7,357,019 B2 | 4/2008 | McDonald et al. | |
| 7,503,312 B2 | 3/2009 | Surnilla et al. | |
| 7,577,511 B1 | 8/2009 | Tripathi et al. | |
| 7,762,237 B2 | 7/2010 | Gibson et al. | |
| 7,900,509 B2 | 3/2011 | Feldkamp et al. | |
| 7,908,913 B2 | 3/2011 | Cinpinski et al. | |
| 7,921,709 B2 | 4/2011 | Doering et al. | |
| 7,930,087 B2 | 4/2011 | Gibson et al. | |
| 8,099,224 B2 | 1/2012 | Tripathi et al. | |
| 8,103,433 B2 | 1/2012 | Hartmann et al. | |
| 8,181,508 B2 | 3/2012 | Cinpinski et al. | |
| 8,286,471 B2 | 10/2012 | Doering et al. | |
| 8,301,362 B2 | 10/2012 | Buslepp et al. | |
| 8,631,688 B1 | 1/2014 | Rayl et al. | |
| 8,666,641 B2 | 3/2014 | Rollinger et al. | |
| 8,667,835 B2 | 3/2014 | Doering et al. | |
| 8,826,891 B2 | 9/2014 | Nishikiori et al. | |
| 9,086,020 B2 * | 7/2015 | Pirjaberi | F02D 41/0087 |
| 9,175,613 B2 | 11/2015 | Parsels et al. | |
| 9,212,610 B2 | 12/2015 | Chen et al. | |
| 9,399,963 B2 | 7/2016 | Loucks et al. | |
| 9,562,470 B2 | 2/2017 | Younkins et al. | |
| 2005/0199220 A1 | 9/2005 | Osigo | |
| 2009/0066337 A1 | 3/2009 | Gibson et al. | |
| 2010/0031738 A1 | 2/2010 | Feldkamp et al. | |
| 2010/0050993 A1 | 3/2010 | Zhao et al. | |
| 2010/0154738 A1 | 6/2010 | Tsukamoto et al. | |
| 2010/0175462 A1 * | 7/2010 | Doering | F01L 13/00 |
| | | | 73/114.31 |
| 2011/0167900 A1 | 7/2011 | Zanotti et al. | |
| 2013/0325290 A1 | 12/2013 | Pierik | |
| 2014/0261309 A1 * | 9/2014 | Chen | F02D 41/0082 |
| | | | 123/320 |
| 2014/0261317 A1 * | 9/2014 | Loucks | F02D 41/0087 |
| | | | 123/350 |
| 2015/0192080 A1 | 7/2015 | Younkins et al. | |
| 2015/0377095 A1 | 12/2015 | Walther et al. | |
| 2016/0024981 A1 * | 1/2016 | Parsels | F02D 41/0087 |
| | | | 123/90.11 |
| 2016/0061127 A1 | 3/2016 | Chen et al. | |
| 2016/0109330 A1 | 4/2016 | Chen et al. | |

OTHER PUBLICATIONS

Written Opinion dated Feb. 23, 2016 from international application No. PCT/US15/56732.

Younkins et al., U.S. Appl. No. 15/384,924, filed Dec. 20, 2016.

* cited by examiner

INDUCTION DIAGNOSTICS FOR SKIP FIRE ENGINE

CROSS REFERENCE TO RELATED APPLICATIONS

This application claims priority of Provisional Application No. 62/067,873 filed on Oct. 23, 2014.

FIELD

The present invention relates generally to methods and mechanisms for diagnosing induction faults in an internal combustion engine. Various embodiments involve measurement and analysis of the intake manifold pressure and/or crankshaft angular acceleration to diagnose induction faults.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber.

Fuel efficiency of internal combustion engines can be substantially improved by varying the engine displacement. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. In this manner, even finer control of the effective engine displacement is possible. For example, firing every third cylinder in a 4 cylinder engine would provide an effective reduction to $\frac{1}{3}^{rd}$ of the full engine displacement, which is a fractional displacement that is not obtainable by simply deactivating a set of cylinders to create an even firing pattern. Similarly, firing every other cylinder in a 3 cylinder engine would provide an effective displacement of ½, which is not obtainable by simply deactivating a set of cylinders.

U.S. Pat. No. 8,131,445 (which is incorporated herein by reference) teaches a continuously variable displacement engine using a dynamic skip fire operational approach, which allows any fraction of the cylinders to be fired on average using individual cylinder deactivation. In a continuously variable displacement mode operated in skip-fire, the amount of torque delivered generally depends heavily on the firing fraction, or fraction of combustion events that are not skipped. In other skip fire approaches a particular firing pattern or firing fraction may be selected from a set of available firing patterns or fractions.

In order to operate with dynamic skip fire control it is necessary to control the intake and exhaust valves in a more complex manner than if the cylinders are always activated. Specifically the intake and/or exhaust valves remain closed during a skipped working cycle to minimize pumping losses. This contrasts with an engine operating on all cylinders, where the intake and exhaust valves open and close on every working cycle. Most vehicles in operation today use a camshaft to open and close the intake valves. The valve train may incorporate a cam phaser to control the timing of the valve opening and closing relative to the crankshaft. Some cam operated engines also have adjustable valve lift. For example, some engines have mechanisms to shift valves between a "high lift" and "low lift" level; for example, a maximum lift of 11 mm for "high lift" and of 4 mm for "low lift". As an alternative to cam controlled valves, some engines use electronic valve actuation, which has more flexibility in the valve opening and closing because the valve motion is not constrained by camshaft rotation.

For cam operated valves a method to deactivate a valve is to incorporate a collapsible valve lifter into the valve train. To activate the valve the lifter remains at its full extension and to deactivate the valve the lifter collapses failing to transfer the cam lobe profile to the valve. Valve activation/deactivation is controlled by a solenoid which deactivates the valve by providing high pressure oil to the collapsible lifter. Other mechanisms exist to deactivate valves in engines with cam operated valves.

U.S. patent application Ser. Nos. 14/487,563, 14/582,008, and 14/700,494, each of which is incorporated herein by reference in their entireties, teach methods of sensing failures of an exhaust valve to open after a combustion event. As pointed out in these applications, failure of the exhaust valve to open will result in high pressure combustion gases being trapped in the cylinder, which can lead to damage of the intake valve and its associated mechanism if it attempts to open against this high pressure.

Failures of an intake valve to activate or deactivate under skip fire control can also have a deleterious impact on engine operation. Failure of the intake valve to open will result in missing a planned firing event. This may lead to unburnt hydrocarbons being transmitted to the engine exhaust and may result in unacceptable emissions. There will also be a loss of engine torque and increased engine roughness. Failure of an intake valve to close may result in increased pumping losses and excess oxygen in the exhaust gases deleteriously impacting the catalytic converter. Failures in the cam adjustment mechanism can also lead to emission and engine performance issues. In all cases information regarding intake valve or cam failures may be required to be communicated to a vehicle on-board diagnostic (OBD) system to satisfy governmental regulations, such as those imposed by the California Air Resources Board (CARB). It is thus desirable to make a determination of whether actual cylinder air induction accurately matches the commanded operation.

SUMMARY OF THE INVENTION

A variety of methods and arrangements for detecting failure of the commanded air induction in an internal combustion engine are described. In some embodiments, the intake manifold pressure is monitored. An air induction event generates a fluctuation in the intake manifold pressure, which is recorded. The signal is processed through a diagnostic filter to help determine whether the actual induction matched the commanded induction. When an induction fault is detected, an induction fault signal may be generated to identify the fault.

In other embodiments a method for detecting induction failure of a cylinder in an internal combustion engine utilizes fluctuations in the crankshaft angular acceleration. The measured angular acceleration is compared with a reference angular acceleration. If the measured value deviates by more than a prescribed threshold, a fault signal is generated. In some embodiments, the fault signal is generated during the same engine cycle in which the fault occurs.

In other embodiments, intake manifold pressure based diagnostics may be combined with crankshaft acceleration based diagnostics to provide higher accuracy rates of induction fault detection.

The describe approaches are particularly well suited for use in engines operating in a skip fire mode with cylinder deactivation and/or a dynamic firing level modulation mode.

A variety of different induction faults can be detected using the described techniques including intake valve activation failures, intake valve deactivation failures, and valve lift faults (e.g., valve lift too low and/or valve lift too high induction faults).

In a nonexclusive embodiment, a signal indicative of intake manifold pressure is filtered to reduce low frequency signal components of the intake manifold pressure signal. The filtered signal is then compared to a fault threshold and a fault signal is generated when the filtered signal passes the fault threshold. In some embodiments, a complementary filter is used to filter the intake manifold signal.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention is a method and apparatus to determine failures of air induction in an internal combustion engine. Induction failures may arise from intake valve activation or deactivation failures or improper response to valve lift commands. The invention is particularly useful for a dynamic skip fire controlled internal combustion engine because of the frequent cylinder activation/deactivation inherent in skip fire operation. In some embodiments an algorithm uses intake manifold absolute pressure to determine if an intake valve has been actuated properly according to its commanded state. In other embodiments an algorithm uses intake manifold absolute pressure to determine if the cam valve lift setting has been actuated properly according to its commanded state. In other embodiments the same functions can be determined using measurement of the crankshaft angular acceleration or time derivatives thereof. In still further embodiments these methods can be combined to provide a more robust diagnostic. The diagnostic techniques described herein improve engine efficiency, reduce noxious emissions and lower the risks of degradation to engine components. The techniques are able to detect a fault in the same engine cycle that it occurs and determine which cylinder has the fault.

In general, dynamic skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. The fire/skip decision may be made on a firing opportunity by firing opportunity basis and the firing controller typically includes an accumulator functionality that tracks the portion of a firing that has been requested but not yet delivered, or delivered, but not yet requested. This decision is typically made some number of firing opportunities prior to the firing event to allow the control system time to correctly schedule the engine for either a skip or fire event. Skip fire control contrasts with conventional variable displacement engine operation in which a fixed set of the cylinders are deactivated during certain low-load operating conditions.

When a cylinder is deactivated in a variable displacement engine, its piston typically still reciprocates, however neither air nor fuel is delivered to the cylinder so the piston does not deliver any net power over an engine cycle. Since the cylinders that are "deactivated" do not deliver power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered during skipped working cycles. This requires a valve deactivation mechanism where the intake and exhaust valves of a cylinder remain closed during a working cycle. In this case, no air is inducted into the deactivated cylinders during the skipped working cycles thereby reducing pumping losses.

Figure 1:
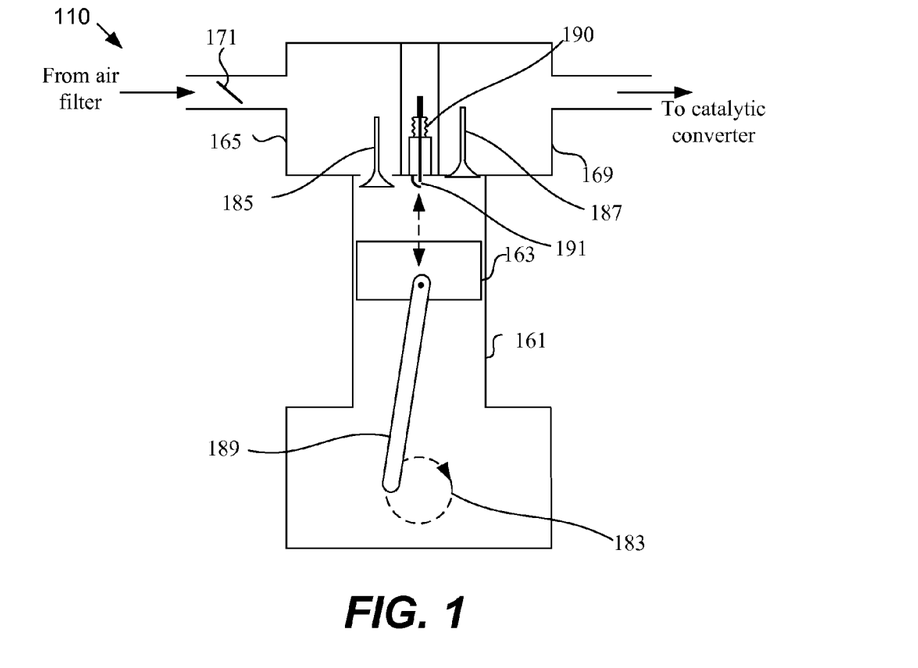
FIG. 1 is a schematic diagram showing a portion of one cylinder of an internal combustion engine.

FIG. 1 illustrates a cylinder of an internal combustion engine 110 that includes a cylinder 161, a piston 163, an intake manifold 165, spark plug 190, and spark gap 191 and an exhaust manifold 169. A throttle valve 171 controls the inflow of air from an air filter or other air source into the intake manifold. Air is inducted from the intake manifold 165 into cylinder 161 through an intake valve 185. Fuel is added to this air either by port injection or direct injection into the cylinder (not shown in FIG. 1). Combustion of the air/fuel mixture is initiated by a spark present in the spark gap 191. Expanding gases from combustion increase the pressure in the cylinder and drive the piston 163 down. Reciprocal linear motion of the piston is converted into rotational motion by a connecting rod 189, which is connected to a crankshaft 183. Combustion gases are vented from cylinder 161 through an exhaust valve 187.

A camshaft (not shown in FIG. 1) may be used to move the intake and exhaust valves synchronously with the crankshaft rotation. The rotating camshaft regulates opening and closing of the intake and exhaust valves. The camshaft includes cam lobes that each have a profile, which is associated with a valve lift schedule. The valve lift schedule includes an amount of time a valve is open (i.e. duration) and a magnitude or degree to which the valve opens (i.e. lift). Valve phasing relative to the crankshaft may be controlled by a cam phaser (not shown in FIG. 1). Some engines employ valve trains that allow for variable valve lift. The valve lift may be either continuously controlled or step-wise selectable, for example two or three steps. Variable lift on the intake valve can reduce pumping losses and can facilitate improved combustion through better air/fuel gas dynamics.

Figure 2:
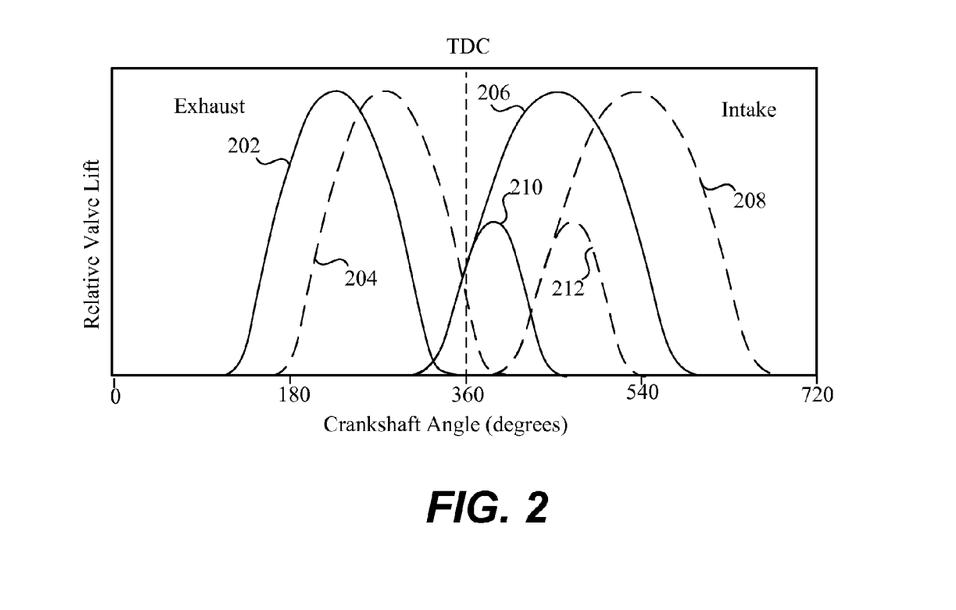
FIG. 2 is a representative plot of valve lift versus crankshaft angle.

FIG. 2 illustrates the valve lift profile associated with a two step valve schedule. Curves 202 and 204 illustrate an exhaust valve lift profile associated with extremes of exhaust valve timing phase adjustment. Curves 206 and 208 illustrate an intake valve lift profile associated with extremes of intake valve timing phase adjustment for the "high lift" schedule. Curves 210 and 212 illustrate the intake valve lift profile associated with extremes of intake valve timing phase adjustment for the "low lift" schedule. The solid curves, 202, 206, and 210 represent the valve lift profile associated with maximum cam phaser advance. The dashed curves 204, 208, and 212 represent the valve lift profile associated with maximum cam phaser retardation.

Figure 3:
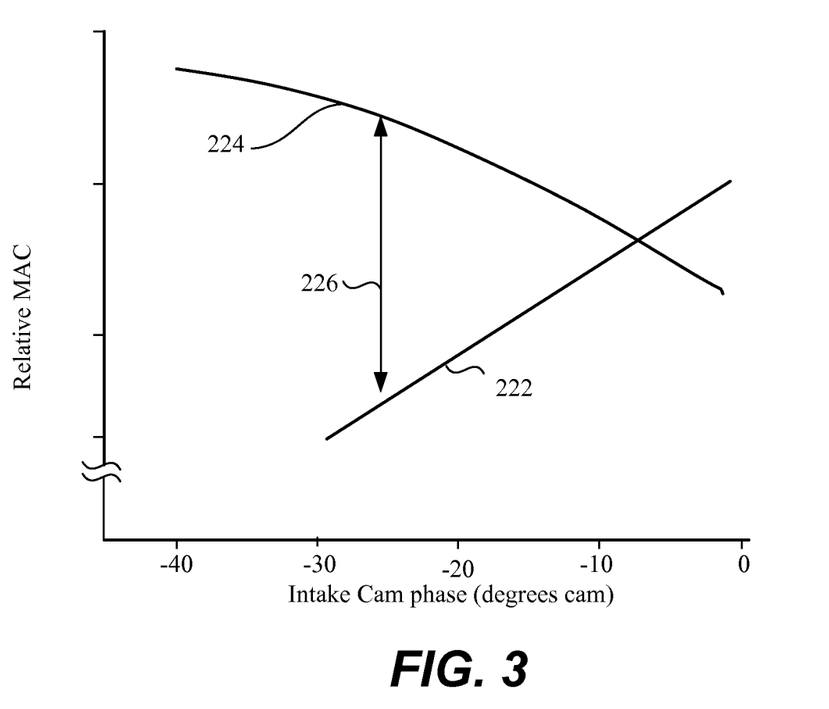
FIG. 3 is a representative plot of cylinder mass air charge (MAC) versus cam angle for a high lift and low lift valve schedule.

FIG. 3 illustrates the resultant amounts of air induction for different cam phaser and valve lift schedules. Generally, the "low lift" schedule 222 inducts less air into a cylinder than the "high lift" schedule 224. This difference in the amount of inducted air 226 can be detected using the diagnostics described herein. The amount of inducted air will also vary with the MAP and engine speed. Changes in the inducted air mass, i.e. mass air charge (MAC), will impact the intake manifold pressure and the crankshaft angular acceleration. These changes can be sensed by the diagnostic apparatus and methods described herein and used to determine whether the amount of inducted air substantially matches the commanded values. If the measured values deviate by more than a prescribed threshold, a fault signal may be generated.

Figure 4:
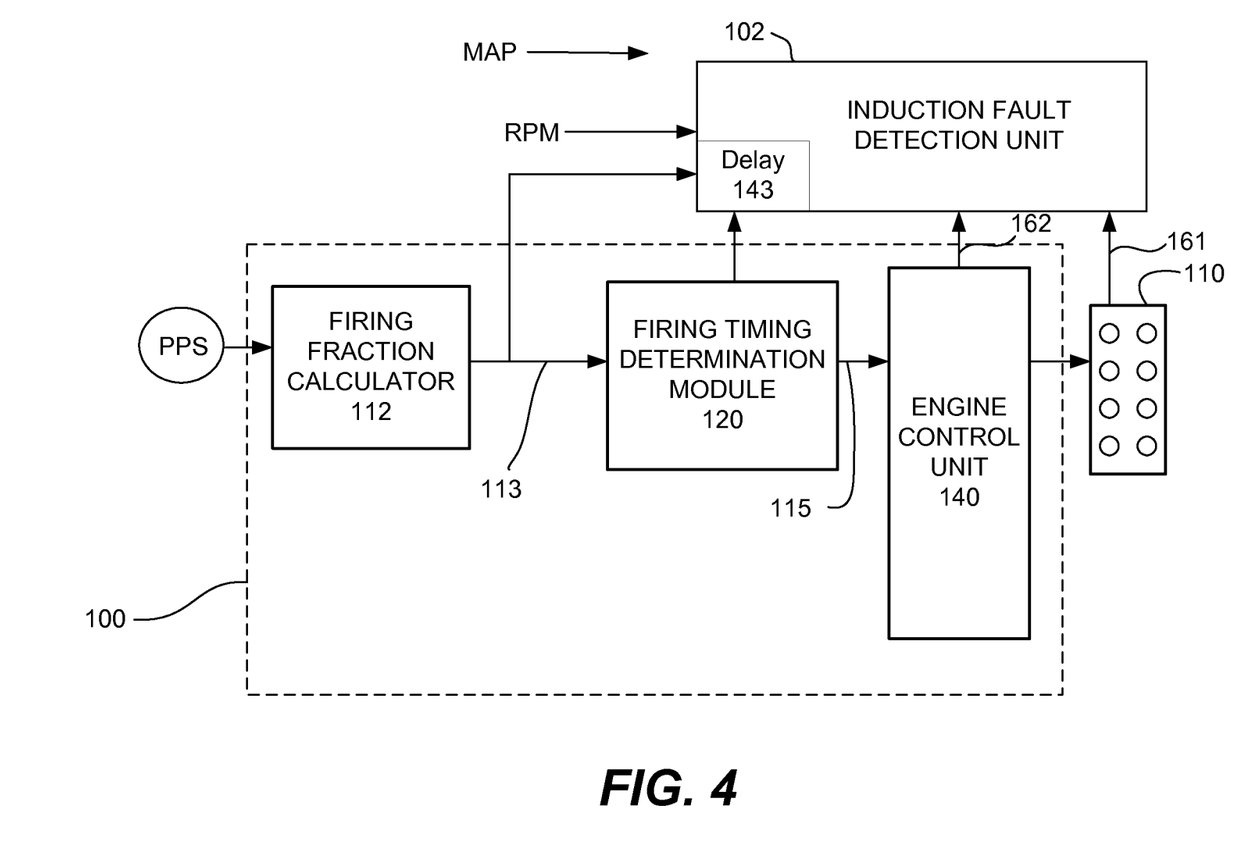
FIG. 4 is a block diagram of an engine controller and an induction fault detection unit according to a particular embodiment of the present invention.

Referring to FIG. 4, an engine controller 100 according to a particular embodiment of the present invention will be described. The engine controller 100 includes a firing fraction calculator 112, a firing timing determination module 120, an engine control unit 140, and an induction fault detection unit 102.

Initially, the firing fraction calculator 112 receives an input signal that is treated as a request for a desired engine output. The firing fraction calculator 112 is arranged to determine a firing fraction, firing sequence, firing pattern or firing density that would be appropriate to deliver the desired output under selected operating conditions. The firing fraction is indicative of the fraction or percentage of firings under the current (or directed) operating conditions that are required to deliver the desired output. The firing fraction calculator generates a commanded firing fraction 113, which is received by the firing timing determination module 120 and the induction failure detection unit 102.

The firing timing determination module 120 is arranged to issue a sequence of firing commands (e.g., drive pulse signal 115) that cause the engine to deliver the percentage of firings dictated by the commanded firing fraction 113. The sequence of firing commands output by the firing timing determining module 120 is passed to an engine control unit (ECU) 140 which orchestrates the actual firings. The firing timing determination module 120 is arranged to deliver a wide variety of firing information to the induction fault detection unit 102. This may include, but is not limited to, the drive pulse signal 115 or a firing sequence, a firing decision for a particular working chamber, a signal indicating the number or identity of that working chamber, and/or the firing history of a selected working chamber. In various applications, this information can be directly sent between the induction fault detection unit 102 and the firing timing determination module 120 or the induction fault detection unit 102 may be able to infer this information. For example, if the firing timing determination module 120 sends a fire/skip signal to the induction fault detection unit 102 additional information on the cam schedule and phase may be sent over signal lines 161 and 162. These two pieces of information, the fire/skip decision and the valve schedule would allow the induction fault detection unit 102 to determine which cylinder is being fired/skipped and the expected MAC associated with the firing opportunity (should it be a fire). The induction failure detection unit 102 may include a delay block 143, which compensates for delays between the commanded valve actuation signal 115 and/or signal 113 and the actual valve movement. In should be appreciated that the engine controller shown in FIG. 4 can be configured in multiple ways; for example the induction failure detection unit 102 may be integrated into engine controller 100.

An advantage of many skip fire engine approaches is that information about future firing decisions is known before the firings actually take place. Various implementations of the present invention take advantage of this feature. More specifically, firing information is used in a wide variety of ways to estimate the anticipated fluctuations in the MAP and/or crank acceleration. Comparison can then be made whether the observed fluctuations are consistent with the estimated fluctuations. If the observed fluctuations exceed a defined range from the estimated fluctuation a fault indication may result. The induction failure detection unit 102 can be used to detect faults in the intake valves and valve lift level. Although the present invention contemplates the use of dynamic skip fire engine control, this should not be considered limiting. The invention may be used in an engine operating on all cylinders or a variable displacement engine, i.e. fixed displacement levels. These control systems generally have more evenly spaced induction events than a skip fire controlled engine, although the amount of inducted air may vary more than in skip fire control.

The assignee of the present application has filed multiple patent applications on a wide variety of skip fire and other engine designs, such as U.S. Pat. Nos. 7,954,474; 7,886,715; 7,849,835; 7,577,511; 8,099,224; 8,131,445; and 8,131,447; 8,616,181; 8,701,628; 9,120,478 and U.S. patent application Ser. Nos. 13/774,134; 13/963,686; 13/963,759; and 13/961, 701, each of which is incorporated herein by reference in its entirety for all purposes. Many of the aforementioned applications describe firing controllers, firing fraction calculators, filters, power train parameter adjusting modules, firing timing determining modules, and other mechanisms that may be integrated into or connected with the engine controller 100 and the induction failure detection unit 102.

Intake Manifold Pressure Based Diagnostics

In some embodiments an algorithm using information on the intake manifold absolute pressure (MAP) can be used to determine induction faults. The variations in the MAP may result from the superposition of multiple components: (1) a possibly steady slowly varying average manifold pressure used to regulate average cylinder charge, (2) a slowly varying component reflecting driver input or—in the case of a skip firing engine, the faster increase and decay of average manifold pressure in response to firing density changes, (3) higher frequency waves that are intake manifold natural resonances excited by separate inductions, much as a bell is excited by separate blows, and finally (4) waves excited by individual inductions or missing inductions.

Figure 5A:
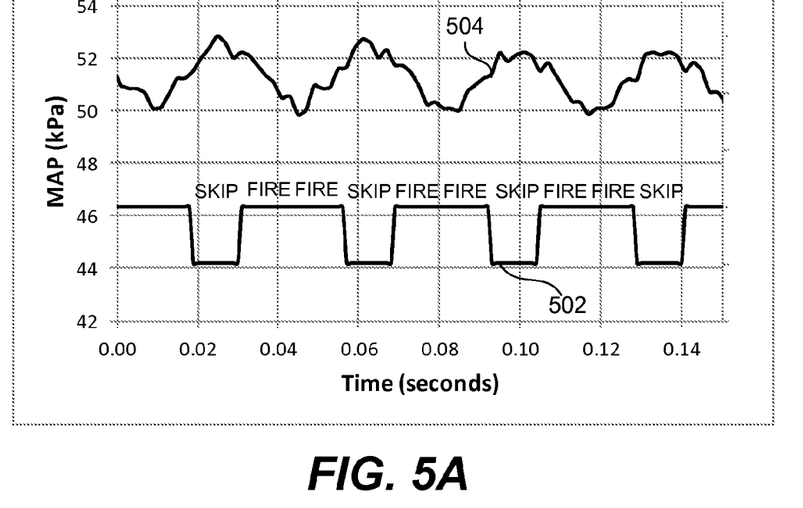
FIG. 5A is a representative plot of intake manifold absolute pressure (MAP) and firing enable signal versus time during normal skip fire operation.

FIG. 5A plots the measured MAP over a number of firing opportunities for an eight cylinder engine operating in skip fire mode at 1250 rpm and a firing fraction of ⅔. A firing fraction of ⅔ results in a fire-fire-skip-fire . . . pattern evident as the high to low variation in the fire enable signal 502. The measured MAP may be determined by one or more pressure sensors situated in an intake manifold. The MAP sensor(s) have a natural bandwidth of greater than 1 kHz. FIG. 5A shows a regular pattern in the measured MAP 504. Induction of air into a cylinder during a firing event results in a MAP drop. Conversely, the absence of air induction, associated with a cylinder skip, results in a MAP increase during a skipped induction event.

Figure 5B:
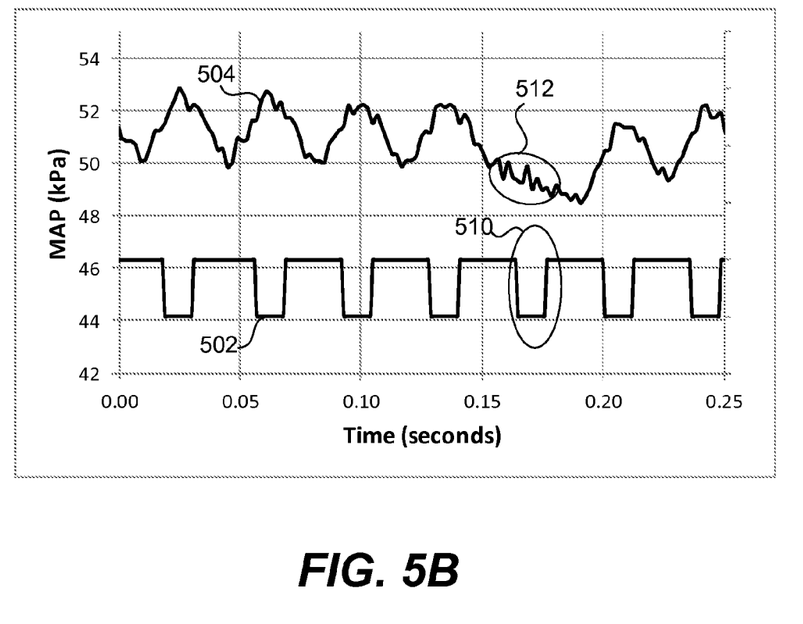
FIG. 5B is a representative plot of intake manifold absolute pressure (MAP) and firing enable signal versus time during an induction fault.

If an engine is operating with a regular firing pattern like that shown in FIG. 5A, an induction failure will be evident as a deviation from that pattern. FIG. 5B shows the same operating conditions as in FIG. 5A except that a cylinder failed to deactivate during a commanded skip event 510. Instead of rising, there is a continued drop in MAP 512. This break in the MAP signal pattern can be detected and used as an induction fault diagnostic.

Figure 6:
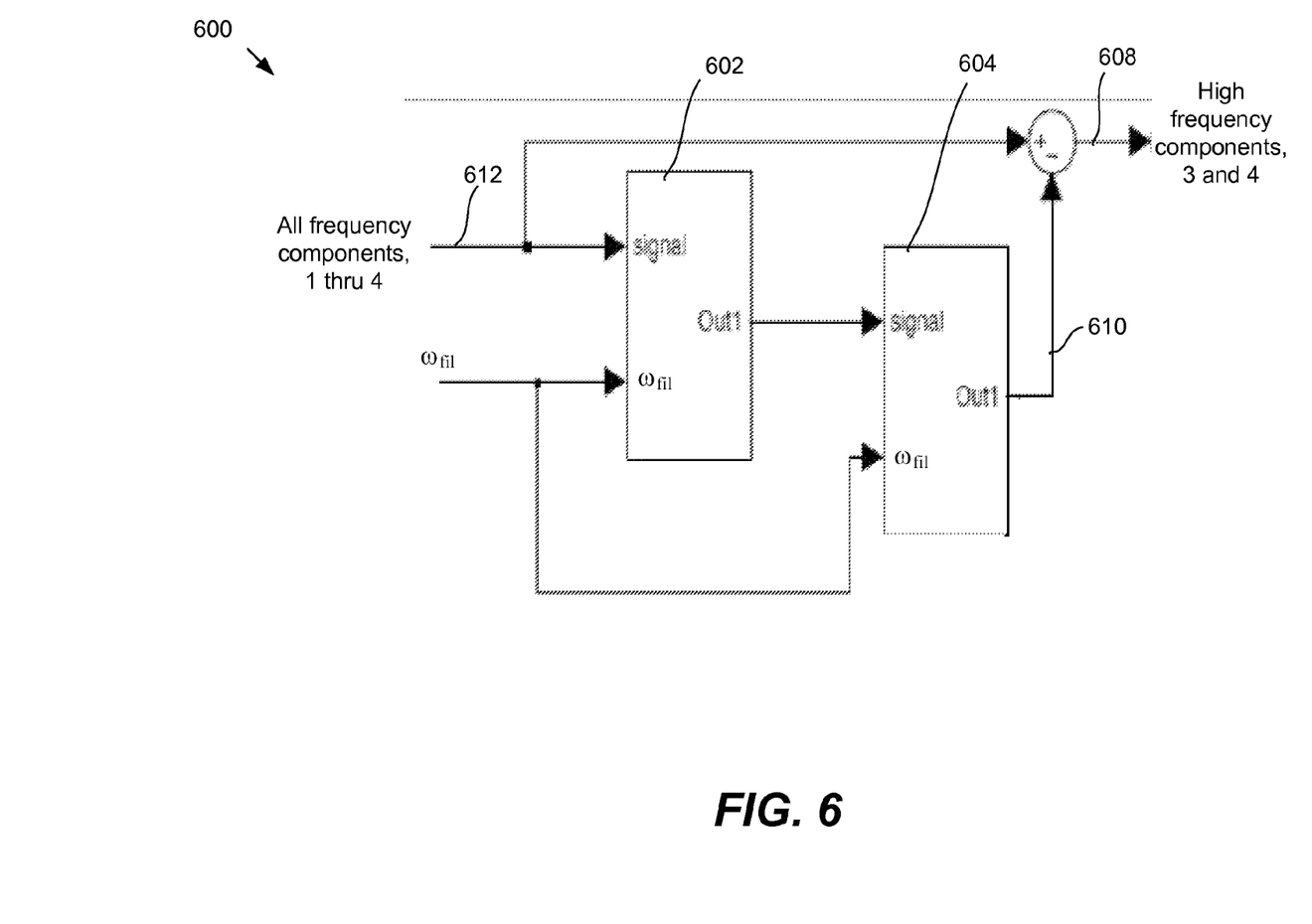
FIG. 6 is a block diagram of a diagnostic filter circuit according to a particular embodiment of the present invention.

FIG. 6 shows a diagnostic filter 600 that may be used to separate low frequency MAP signal components (1) and (2) from higher frequency components (3) and (4). The filtered output 608 has substantially reduced the low frequency signal components compared to the MAP signal input 612. Removing the low frequency components makes subsequent diagnostic thresholding and logic simpler, as their time scale is far different than signals caused by (3) or (4). The last component (4) due to commanded inductions or deactivations can be compared to their expected value and used to diagnose proper induction behavior, i.e. was the cylinder skip/fire executed as commanded and/or was the valve lift schedule executed as commanded. The diagnostic filter used may be built by filtering the input signal 612 using two identical cascaded first order low pass filters 602 and 604 and then subtracting this output 610 from the input signal 612 as shown in FIG. 6. This architecture results in an output filtered signal 608 without any DC offset and reduced low frequency content. Diagnostic filter 600 may be referred to a complementary filter, since it separates out and isolates high frequency components from the overall signal. This filter has minimal phase delay, which allows detection of an induction fault during the same engine cycle as the fault occurs. While the filter structure shown in FIG. 6 works well it is not the only form possible, and other types of low pass filter structures may be used.

The $\omega_{fil}$ input to first low pass filter 602 and second low pass filter 604 is based on the intake manifold cutoff frequency, the inverse of the manifold filling or emptying exponential time constant. The manifold's 3 dB cutoff frequency $\omega_{man}$, may be determined from the manifold dimensions and dynamic response or some other means. The frequency $\omega_{fil}$ may be a multiple, K, of the manifold's 3 dB cutoff frequency $\omega_{man}$ and K may be on the order of 10. The constant K depends on various engine parameters such as, but not limited to, manifold volume, total engine displacement, and number of cylinders. It also may vary as a function of engine parameters such as, but not limited to, cam angle, valve lift schedule, and engine speed. It also may vary with the control implementation architecture such as a discrete or continuous implementation. As mentioned previously, subtraction of the output 610 from the initial signal 612 results in an output filtered signal 608 with no DC and lower frequency components, concentrating diagnosis on higher frequency components induced by valve operation faults. The diagnostic filter 600 uses $\omega_{fil}$ to lessen the effect of low frequency pressure variation from driver input and low frequency filling and emptying disturbances. This aids in the application of a threshold because the filter output produces large positive deviations at a fault. A positive deviation produced by a fault will exceed the applied threshold.

Figure 7A:
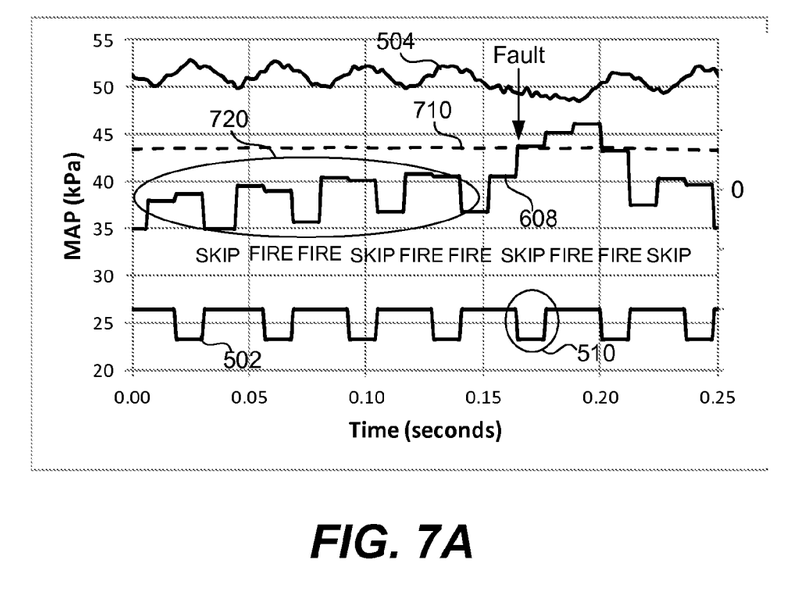
FIG. 7A is a representative plot of an output of a diagnostic filter according to an embodiment of the present invention.

FIG. 7A shows the resultant diagnostic filter output 608 derived from MAP signal 504 shown in FIG. 5B. Also included for reference in FIG. 7A is the MAP signal 504 and fire enable signal 502. Region 720 represents a fault free region where the engine is properly executing induction commands from the engine controller. Once again the commanded skip event 510 fails to deactivate the intake valve and the cylinder experiences an induction event. When this fault occurs the diagnostic filter output 608 exceeds a threshold 710 generating an induction fault signal (not shown in FIG. 7A). Note that filter output 608 has an average value near zero (reference on right side vertical axis in FIG. 7A).

The fault diagnostic apparatus and method described above work well for engines operating with repetitive firing patterns; however, it may not be robust under dynamic skip fire operation. Dynamic skip fire operation is quite different from the operation in a more conventional engine, in which each working chamber is steadily fired; for example, once every two engine revolutions for a 4 stroke engine. Because dynamic skip fire engine control can involve different working chambers with different firing sequences, there is a greater likelihood of complex MAP behavior especially during transient operation when the firing fraction is changing.

Figure 7B:
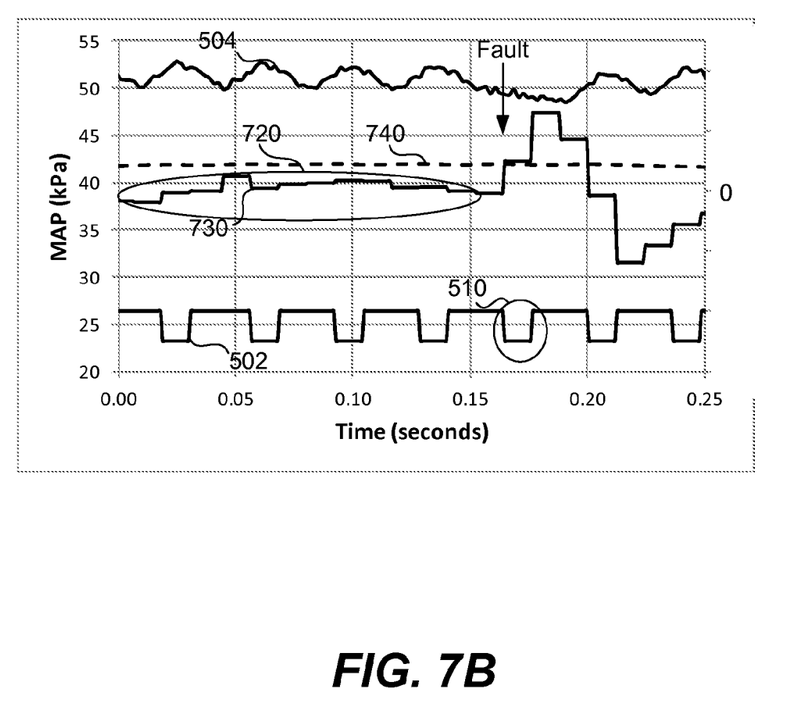
FIG. 7B is a representative plot of an output signal indicating an induction fault according to an embodiment of the present invention.

Since the filtered output 608 drifts in transient engine operation and may result in false fault indications, improved fault detection can be achieved by applying additional processing to the filtered output 608. The results of this approach are shown in FIG. 7B. This figure is similar to FIG. 7A with common designators, except with the filtered output 608 has been replaced by an output signal 730 and the thresholds 710 and 740 may be different. In FIG. 7B an induction fault is detected once the output signal 730 exceeds the threshold 740. Again, note that filter output 730 has an average value near zero (reference on right side vertical axis in FIG. 7B).

Figure 8:
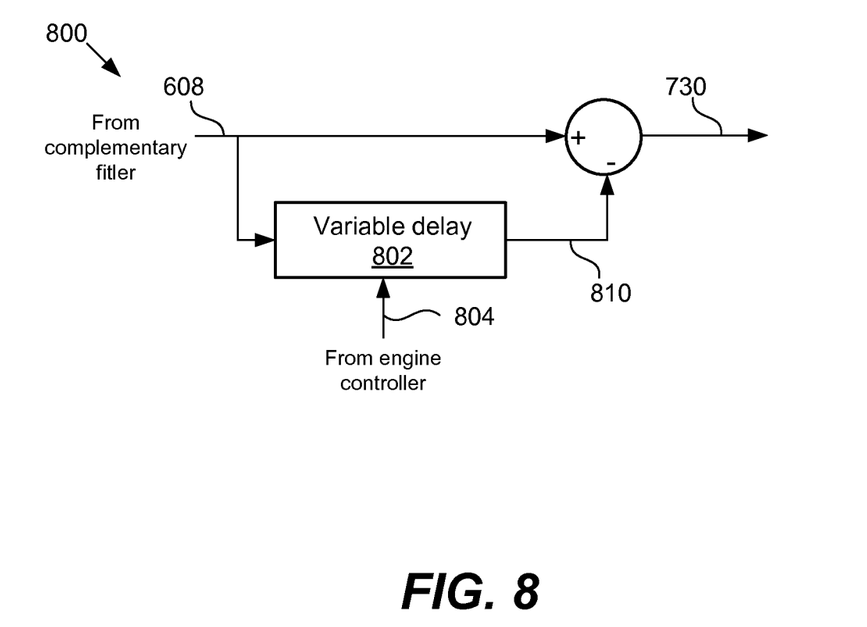
FIG. 8 is a block diagram of a system to produce an output signal indicative of induction faults according to an embodiment of the present invention.

Output signal 730 may be produced using a system shown in FIG. 8. FIG. 8 is a schematic diagram of a system 800 that takes as inputs filtered output 608 from the diagnostic filter 600 and firing information from the engine controller 100 (shown in FIG. 4). The system 800 takes the difference between the filtered output 608 and a delayed version of that signal 810 to produce an output signal 730. The amount of delay is determined by variable delay block 802, which has as an input firing information 804 from the engine controller. In one embodiment input firing information 804 includes the operating firing fraction. The time delay interval applied by time delay block 802 may be the firing fraction denominator multiplied by the period between firing opportunities. This effectively produces an output signal 730 that compares the filtered output 608 behavior for the current firing opportunity with its value at the last similar firing opportunity, i.e. the same phase in the cyclic firing pattern. As shown in FIG. 7B there is less variation in the output signal 730 than filtered output 608 in the region of fault free operation 720. During transients the firing fraction may not be uniform, so the firing fraction denominator is not uniquely defined. In this case, the time delay chosen may be the most recent firing opportunity that has the same commanded induction conditions as the opportunity under test. This algorithm also has lower noise on the output signal 730 as compared to the filter output 608.

It should be appreciated that the rates of sampling and filtering may be adjusted to provide robust fault detection without excessive processing requirements. For example, the MAP signal may be delivered at 1 msec rate, while the diagnostic filter output 608 may update at a less frequent interval, such as 90 degrees of crank angle as depicted in FIGS. 7A and 7B. The sampling and processing rates may be based on time, crankshaft rotation (angle), or various combinations and permutations thereof. Also the threshold level for fault detection may be a variable based on engine MAP, engine speed, and other variables.

The preceding description of an induction fault detection apparatus and method has used an example of detecting an induction failure resulting from a commanded skip event erroneously resulting in an unintended cylinder induction event. The same methods and apparatus may be used with the appropriate adjustment of the thresholds to detect other types of induction failures, such as a fire command resulting in a skip, a high lift command resulting in a low lift or a low lift command resulting in a high lift. It should also be appreciated that other filtering methods may be used to isolate the fluctuations associated with specific induction opportunities and determine whether they match the predicted fluctuations.

Crankshaft Angular Acceleration Based Diagnostics

Figure 9:
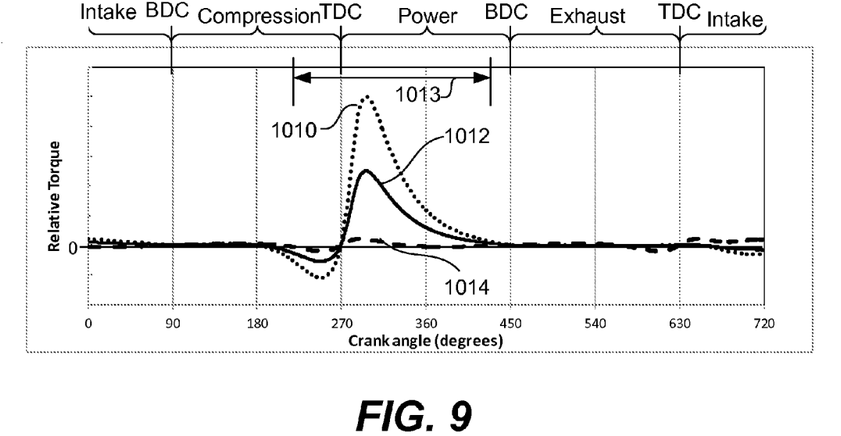
FIG. 9 is a representative plot of the torque absorbed and produced by a cylinder under test over an engine cycle for different types of induction events.

In some embodiments an algorithm using information on the crankshaft angular acceleration can be used to determine induction faults. FIG. 9 shows the torque profile of a cylinder over an engine cycle associated with different types of commanded intake valve action. A fire command with a high lift valve schedule generates a large torque pulse after top dead center (TDC), curve 1010. A fire command with a low lift valve schedule generates a smaller torque pulse after top dead center (TDC), curve 1012. Both curves 1010 and 1012 also show a negative torque pulse prior to TDC. In contrast a commanded skip, having no induction since the intake valve remains closed, results in little torque either generated or absorbed, curve 1014. These torque signature differences may be used to diagnose induction faults.

The torque signature of all engine cylinders and other engine loads can be estimated to determine a total net torque acting on the crankshaft. In skip fire operation the torque signature of each cylinder can vary on a cycle by cycle basis and this must be considered in the calculation of total net torque. Since the crank angular acceleration is proportional to torque, the net crankshaft angular acceleration can be calculated. The calculated angular acceleration may be defined as a reference angular acceleration. The reference angular acceleration represents the anticipated crank angular acceleration in the absence of any faults.

Actual crankshaft angular acceleration can be determined using input from a crank rotation sensor that measures the time period between passages of successive crank mounted indices past a fixed point. The measured crankshaft acceleration signal can be compared with the reference acceleration. If the measured acceleration signal deviates from the reference acceleration by more than a prescribed threshold a fault signal is generated.

It is advantageous to compare the measured and reference crank acceleration in a time window 1013 slightly before and somewhat after TDC between the compression and power stroke of the cylinder under test. As shown in FIG. 9 the difference in torque between the different induction states (high lift, low lift, no lift) is greatest in this area, so detecting the differences is easiest during this time window. The comparison may be made over the entire time window 1013 or any portion or multiple portions thereof.

In determining the reference acceleration it is essential to consider operation of other engine cylinders in addition to the cylinder under test. Generally the engine cylinders adjacent to the cylinder under test in the engine firing order have the most influence on the torque during the induction fault test window 1013 and are most important to consider when determining the reference acceleration. Of particular importance is whether these cylinders were skips or fires because, as shown in FIG. 9, the largest torques are generated during the compression and power stroke and these strokes of the adjacent cylinders can partially overlap with the fault detection window of the cylinder under test. The adjacent cylinder firing pattern can take four possible forms, i.e. skip-skip, skip-fire, fire-skip, fire-fire. Depending on the adjacent cylinder pattern the reference threshold may vary. The influence of adjacent cylinders on the expected torque from a cylinder under test is described in U.S. patent application Ser. Nos. 14/207,109 and 14/880,652, which are incorporated herein by reference. In other embodiments, more complex cylinder pressure models that consider the effects of still other (e.g. non-adjacent) cylinders may be used to determine the reference crank acceleration. This may be a model that considers the impact of all of the cylinders or a larger subset of the cylinders beyond simply the adjacent cylinders in the firing order. Some such models are described in the incorporated '652 application.

Figure 10:
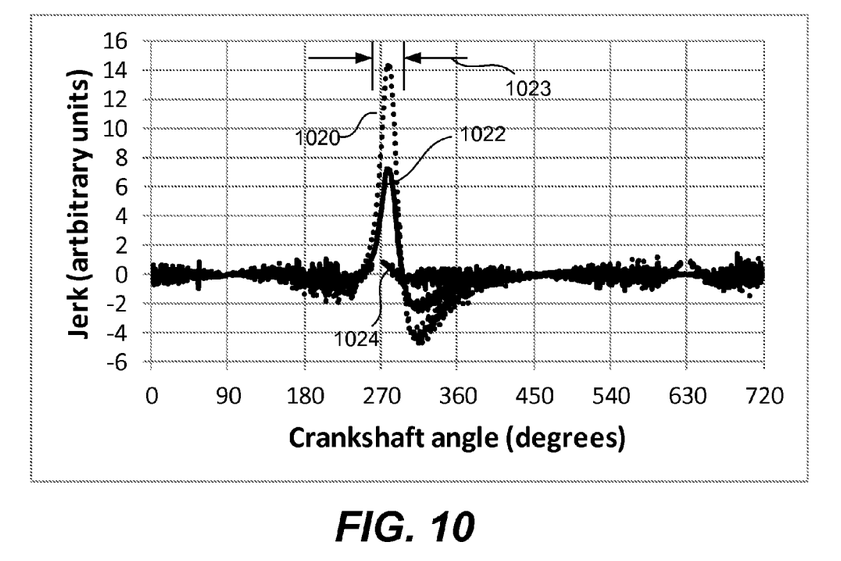
FIG. 10 is a representative plot of the calculated crankshaft jerk induced by a cylinder under test over an engine cycle for different types of induction events.

Aside from and/or in addition to crankshaft angular acceleration, the time derivative of the angular acceleration, jerk, may be used to detect induction faults. FIG. 10 shows the jerk as a function of crankshaft angle. Curves 1020, 1022, and 1024 show the jerk associated with the high lift, low lift, and no lift induction states, respectively. These three jerk curves are effectively the slope of the angular acceleration curves 1010, 1012, and 1014 shown in FIG. 9. The time window for induction fault detection 1023 using crank jerk may be smaller than the detection window using crank acceleration 1013, since the jerk peaks are narrower in time than those associated with the angular acceleration.

In should be appreciated that while the methods described here compare a reference angular acceleration or jerk with the corresponding measured values, substantially equivalent comparison may be made using other parameters. For example, instead of determining a reference angular acceleration a reference torque may be determined. A comparison may then be made whether the measured torque (based on the crankshaft angular acceleration) is consistent with the reference value.

Additionally, in some skip fire control schemes when a cylinder under test is scheduled to be a skip, but the intake valve fails to deactivate, air is inducted into the cylinder during the intake stroke and compressed; however, it is not fired during the combustion stroke. In such operation the cylinder is operating as an air spring. This operational mode produces a distinctive torque and jerk signature like those shown in FIGS. 9 and 10 for other operational modes. An induction fault in this operational mode may be detected using the same techniques as described above.

Other Features

While detection of an induction fault has been described by measuring the MAP and crankshaft accelerations it should be appreciated that the approaches may be combined with each other. That is both a MAP based fault signal and crank acceleration based fault signal could be input into an AND gate. A fault would only be registered if both inputs indicated the presence of a fault. In an alternative architecture the MAP and crankshaft based diagnostics could produce a three state (yes, no, and maybe) or continuous output. These outputs could be combined in various ways to generate the fault signal. For example, one system producing a "maybe" and the other producing a "yes" may be interpreted as a fault. Alternatively, both systems may generate a continuous value between 0 and 1, where 0 represents definitely no fault and 1 represents definitely a fault. Intermediate values can be combined in various ways to determine whether a fault is present For example if the MAP based system gave a reading of 0.8 and the crank based system gave a reading of 0.6 these readings could be summed to give a value of 1.4, which might be above a detection threshold indicating a fault. These types of architecture combining multiple inputs may result in fewer false positive fault detections than a system based on a single measured parameter. It is also possible to combine the MAP and/or crank fault signal with other diagnostic signals; for example, an intake valve proximity sensor, an in-cylinder pressure sensor, an exhaust pressure sensor and/or oxygen sensor, to provide for a further reduced error level.

The generated fault signals may be inputted into an OBD system. The OBD system may perform statistical analysis on the fault signals to determine whether any corrective action is required. For example, reoccurring faults on a particular cylinder may indicate a failure in some aspect of that cylinder's induction system requiring corrective action. An indicator may alert a vehicle driver that such action is required.

The figures refer to subcomponents and functional blocks that perform various functions. It should be appreciated that some of these subcomponents may be combined into a larger single component, or that a feature of one subcomponent may be transferred to another subcomponent. The present invention contemplates a wide variety of control methods and mechanisms for performing the operations described herein, and is not limited to what is expressly shown in the figures. For example, in the various illustrated embodiments, the firing information provided to the induction failure detection unit 102 is typically described as coming from the firing fraction calculator 112 and/or the firing timing determination module 120. Although this architecture works well, it should be appreciated that such information can come from any suitable source. For example, in many implementations, the functionality of the firing fraction calculator and firing timing determination module will be accomplished by an engine control unit (ECU) or a power train controller that may not incorporate readily identifiable modules that perform the corresponding functions.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines, axial engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles. The described embodiments can be adjusted to work with engines having equally or unequally sized working chambers.

While the described embodiments work well with dynamic skip fire engine operation, it should be appreciated that it may be applied to other types of engine control which may be concerned about the possibility of induction faults. This includes virtually any skip fire application (operational modes in which individual cylinders are sometimes fired and sometime skipped during operation in a particular operational mode) including skip fire operation using fixed firing patterns or firing sequences as may occur when using rolling cylinder deactivation and/or various other skip fire techniques. Similar techniques may also be used in various skip fire like techniques such as dynamic firing level modulation and variable stroke control. In variable stroke engine control, the number of strokes in each working cycle are altered to effectively vary the displacement of an engine. In dynamic firing level modulation, the output of fired cylinders are varied dynamically in a skip/fire type pattern. For example, a particular cylinder may sometimes be fired at a "high" or "higher" torque output level and may sometimes be fired at a "low" or "lower" torque output level, with the "low" output levels corresponding to the "skips" and the "high" output levels corresponding to the fires in a skip fire pattern. In another example, a multi-level skip fire pattern may include some "skips", some "low" firings and some "high" firings. A variety of dynamic firing level modulation and multi-level skip fire techniques are described in Applicant's U.S. patent application Ser. No. 14/919,018, which is incorporated herein by reference. One way to differentiate between "high" and "low" firings is to modulate the valve lift which can lead to valve lift fault based induction faults which can be detected using the described techniques.

The invention has generally been described in terms of a skip fire control system that fires a fuel/air charge during the same cycle as the induction event that filled the cylinder with the charge. Also, the invention has generally been described in terms of a skip fire control system that vents the combustion gases from a cylinder firing during an exhaust stroke immediately following the power stroke where the fuel/air charge was firing. Neither of these valve control schemes is a requirement. A cylinder may induct an air charge and wait one or more cycles before firing the charge. Similarly, a cylinder may hold combustion gases within the cylinder for one or more engine cycles after a combustion event. Engines operating in this manner will have different MAP and crankshaft variation signatures, but the methods described here can be readily adapted to accommodate these different valve control schemes.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein.

What is claimed is:

1. A method of detecting an induction fault of a cylinder in an internal combustion engine having an intake manifold, the method comprising:
    operating the engine in a skip fire mode using an engine control unit, the engine control unit including a firing timing determining unit arranged for determining the timing of working chamber firings of the engine when operating in the skip fire mode;
    sensing the intake manifold pressure and generating an intake manifold pressure signal indicative of the intake manifold pressure;
    filtering the intake manifold pressure signal to reduce low frequency signal components of the intake manifold pressure signal;
    comparing the filtered intake manifold pressure signal or a processed version of the filtered intake manifold pressure signal to a fault threshold; and
    generating a fault signal when an induction fault is detected, wherein the induction fault detection is based at least in part on a determination that the filtered intake manifold pressure signal or the processed version of the filtered intake manifold pressure signal has passed the fault threshold,
    wherein the fault signal is generated when the engine is operating in the skip fire mode.

2. A method as recited in claim 1 wherein a complementary filter is used to filter the intake manifold signal.

3. A method as recited in claim 1 wherein the fault signal is generated during the same engine cycle in which the fault occurs.

4. A method as recited in claim 1 wherein the induction fault indicates the failure of an intake valve to open as desired.

5. A method as recited in claim 1 wherein the fault threshold is a valve activation failure threshold and the fault signal is generated when the filtered manifold pressure signal or the processed version of the filtered intake manifold pressure signal exceeds the valve activation failure threshold, whereby the induction fault indicates that an intake valve failed to open when it was expected to open.

6. A method as recited in claim 1 wherein the fault threshold is a valve deactivation failure threshold and the fault signal is generated when the filtered manifold pressure signal or the processed version of the filtered intake manifold pressure signal falls below the valve deactivation failure threshold, whereby the induction fault indicates that an intake valve opened when the intake valve was intended to remain closed.

7. An engine control unit arranged to control the operation of an engine, the engine control unit including an induction fault detection unit, the induction fault detection unit comprising:
    a filter arranged to filter an intake manifold pressure signal indicative of an intake manifold pressure to reduce low frequency signal components of the intake manifold pressure signal;
    a comparator that compares the filtered intake manifold pressure signal to a fault threshold; and
    wherein the induction fault detection unit is configured to generate a fault signal when an induction fault is detected, wherein the induction fault detection is based at least in part on a determination that filtered intake manifold pressure signal has passed the fault threshold,
    wherein the induction fault corresponds to a valve lift fault in which an intake valve opens but fails to open a desired amount.

8. An engine control unit as recited in claim 7 wherein the fault threshold is a valve lift too low threshold and the fault signal is generated when the filtered manifold pressure signal or the processed version of the filtered intake manifold pressure signal exceeds the valve lift too low threshold, whereby the induction fault indicates that an intake valve lift was lower than intended.

9. An engine control unit as recited in claim 7 wherein the fault threshold is a valve lift too high threshold and the fault signal is generated when the filtered manifold pressure signal or the processed version of the filtered intake manifold pressure signal falls below the valve lift too high threshold, whereby the induction fault indicates that an intake valve lift was higher than intended.

10. A method as recited in claim 1 wherein the filtered intake manifold pressure signal has a zero centered output.

11. A method as recited in claim 2 wherein the filtering further comprises summing an output of the complementary filter with a delayed output of the complementary filter to obtain the filtered manifold pressure signal.

12. An engine control unit arranged to control the operation of an engine, comprising:
    a skip fire module configured to direct operation of the engine in a skip fire operating mode, the skip fire module further comprising a firing timing determining unit arranged to determine the timing of working chamber firings when the engine is operated in the skip fire operating mode,
    a filter arranged to filter an intake manifold pressure signal indicative of an intake manifold pressure to reduce low frequency signal components of the intake manifold pressure signal;
    a comparator that compares the filtered intake manifold pressure signal or a processed version of the filtered intake manifold pressure signal to a fault threshold; and
    an induction fault detection unit is configured to generate a fault signal when an induction fault is detected, wherein the induction fault detection is based at least in part on a determination that filtered intake manifold pressure signal or a processed version of the filtered intake manifold pressure signal has passed the fault threshold, wherein the induction fault detection unit is further configured to detect induction faults while the engine is operated in the skip fire operating mode.

13. An engine control unit as recited in claim 12 wherein the filter includes a complementary filter.

14. An engine control unit as recited in claim 12 wherein the filter includes cascaded first and second first order low pass filters that filter the intake manifold pressure signal and a subtractor arranged to subtract the output of low pass filters from the intake manifold pressure signal to produce the filtered intake manifold pressure signal.

15. An engine control unit as recited in claim 13 wherein the filter further comprises an adder arranged to sum an output of the complementary filter with a delayed output of the complementary filter to obtain the filtered intake manifold pressure signal.

16. An engine control unit as recited in claim 12 wherein the filtered intake manifold pressure signal has a zero centered output.

17. An engine control unit as configured to direct operation of an engine in a dynamic firing level modulation mode, the engine control unit further comprising a firing timing determining unit arranged to determine the magnitude of working chamber firings when the engine is operated in the dynamic firing level modulation mode, the engine control unit further including:
   a filter arranged to filter an intake manifold pressure signal indicative of an intake manifold pressure to reduce low frequency signal components of the intake manifold pressure signal;
   a comparator that compares the filtered intake manifold pressure signal to a fault threshold; and
   an induction fault detection unit configured to generate a fault signal when an induction fault is detected, wherein the induction fault detection is based at least in part on a determination that filtered intake manifold pressure signal has passed the fault threshold,
   wherein the induction fault detection unit is configured to detect induction faults while the internal combustion engine is operated in the dynamic firing level modulation mode.

18. An engine control unit arranged to control the operation of an engine, the engine control unit including an induction fault detection unit, the induction fault detection unit comprising:
   a filter arranged to filter an intake manifold pressure signal indicative of an intake manifold pressure to reduce low frequency signal components of the intake manifold pressure signal;
   a comparator that compares the filtered intake manifold pressure signal to a fault threshold; and
   wherein the induction fault detection unit is configured to generate a fault signal when an induction fault is detected, wherein the induction fault detection is based at least in part on a determination that filtered intake manifold pressure signal has passed the fault threshold,
   wherein the induction fault detection unit is configured to generate the fault signal during the same engine cycle in which a fault occurs.

19. An engine control unit arranged to control the operation of an engine, the engine control unit including an induction fault detection unit, the induction fault detection unit comprising:
   a filter arranged to filter an intake manifold pressure signal indicative of an intake manifold pressure to reduce low frequency signal components of the intake manifold pressure signal;
   a comparator that compares the filtered intake manifold pressure signal to a fault threshold; and
   wherein the induction fault detection unit is configured to generate a fault signal when an induction fault is detected, wherein the induction fault detection is based at least in part on a determination that filtered intake manifold pressure signal has passed the fault threshold,
   wherein the induction fault detected by the induction fault detection unit is selected from the group consisting of:
   a valve activation failure indicative of the failure of an intake valve to open when the valve is expected to open;
   a valve deactivation failure indicative of the failure of the intake valve to remain closed when the valve is intended to be kept closed;
   a valve lift too low failure indicative of the intake valve lift being lower than intended; and
   a valve lift too high threshold indicative of the intake valve lift being higher than intended.

20. An engine control unit as recited in claim 12 wherein the engine control unit includes a processor and the functionality of the induction fault detection unit is embodied in computer code executing on the processor.

21. An induction fault detection unit for detecting induction faults in an internal combustion engine having an intake manifold, the induction fault detection unit comprising a filter arranged to filter an intake manifold pressure signal to reduce low frequency signal components of the intake manifold pressure signal, the induction fault detection unit being further configured to compare the filtered intake manifold pressure signal or a processed version of the filtered intake manifold pressure signal to a fault threshold and to generate a fault signal when an induction fault is detected,
   wherein the induction fault detection is based at least in part on a determination that filtered intake manifold pressure signal or a processed version of the filtered intake manifold pressure signal has passed the fault threshold,
   wherein the induction faults detected by the induction fault detection unit is selected from the group consisting of:
   a valve activation failure indicative of the failure of an intake valve to open when the valve is expected to open;
   a valve deactivation failure indicative of the failure of the intake valve to remain closed when the valve is intended to be kept closed;
   a valve lift too low failure indicative of the intake valve lift being lower than intended; and
   a valve lift too high threshold indicative of the intake valve lift being higher than intended.

22. An induction fault detection unit as recited in claim 21 wherein the filter includes a complementary filter.

23. An induction fault detection unit as recited in claim 22 wherein the filter further comprises an adder arranged to sum an output of the complementary filter with a delayed output of the complementary filter to obtain the filtered intake manifold pressure signal.

24. An engine control unit as recited in claim 17, wherein the induction fault detection unit is configured to generate the fault signal during the same engine cycle in which a fault occurs.

* * * * *